United States Patent [19]

Lowing

[11] Patent Number: 4,601,628
[45] Date of Patent: Jul. 22, 1986

[54] STORAGE STRUCTURES

[76] Inventor: Michael M. Lowing, 89 Lower West Burleigh Road, Burleigh Heads, Queensland, 4220, Australia

[21] Appl. No.: 653,228
[22] PCT Filed: Jan. 17, 1984
[86] PCT No.: PCT/AU84/00010
  § 371 Date: Sep. 14, 1984
  § 102(e) Date: Sep. 14, 1984
[87] PCT Pub. No.: WO84/02895
  PCT Pub. Date: Aug. 2, 1984

[30] Foreign Application Priority Data

Jan. 17, 1983 [AU] Australia .................. PF7640
May 31, 1983 [AU] Australia .................. PF9617

[51] Int. Cl.$^4$ .................................. E04H 6/16
[52] U.S. Cl. ................... 414/250; 414/243; 384/461; 384/572; 384/574; 384/578
[58] Field of Search .......... 198/797; 414/233, 250, 414/242, 247, 765, 766, 266, 267, 331, 764; 384/461, 572, 574, 578; 211/1.5, 164

[56] References Cited

U.S. PATENT DOCUMENTS

| | | | |
|---|---|---|---|
| 1,144,245 | 6/1915 | Reber | 384/578 |
| 1,356,535 | 10/1920 | Lewis | 414/764 X |
| 1,553,882 | 9/1925 | Simpson | 414/576 |
| 2,297,199 | 9/1942 | Buddecke | |
| 2,663,437 | 12/1953 | Gaiola | 414/250 |
| 2,689,658 | 9/1954 | Youell | 414/250 |
| 3,077,994 | 2/1963 | Foster | |
| 4,056,293 | 11/1977 | Lobeck et al. | 384/578 |
| 4,133,587 | 1/1979 | Kume | 384/461 |
| 4,364,703 | 12/1982 | Pai | |

FOREIGN PATENT DOCUMENTS

| | | | |
|---|---|---|---|
| 640796 | 6/1964 | Belgium | 414/242 |
| 2304856 | 8/1974 | Fed. Rep. of Germany | |
| 853088 | 3/1940 | France | |
| 219600 | 2/1942 | Switzerland | |

Primary Examiner—Frank E. Werner
Attorney, Agent, or Firm—Schwartz, Jeffery, Schwaab, Mack, Blumenthal & Evans

[57] ABSTRACT

A rotary storage structure (10) has a supporting frame (12) provided with circular tracks (29, 35) provided with rollers (31) which support independently rotatable sub-frames (15, 16). Each sub-frame (15, 16) is provided with pairs of co-axial rings (36) which support self-righting storage platforms (37) for items (e.g. motor vehicles) loaded into, or from, the structure (10) from loading platforms or ramps (44). A cable drive (42) is provided to rotate each sub-frame (15, 16) to enable the storage platforms (37) to be positioned adjacent the loading platforms or ramps (44).

6 Claims, 11 Drawing Figures

STORAGE STRUCTURES

BACKGROUND OF THE INVENTION

(1) Field of the Invention

This invention relates to rotary storage structures. The invention may be used as a storage or parking structure for vehicles (e.g. automobiles, boats) or as a storage structure for containers, components, documents, files or other items.

(2) Prior Art

The storage and retrieval of items is a considerable problem and the storage facilities which are required can often require large capital outlays which must be financed by a company's operations. The storage systems must be as space efficient as possible and allow simple and ready access and retrieval of the items stored therein.

The need for adequate parking facilities for motor vehicles is one problem which faces municipal authorities worldwide. Multi-storied car parks, both above and below ground are very expensive to construct on a dollar-per-vehicle basis and generally considerable space is required for the provision of ramps and driveways. Rotary parking structures, such as those disclosed in United Kingdom Pat. Nos. 2071630 (Tang Kunay Pai) and 2030550 (D. P-W. Chan et al) have been proposed as possible solutions. However, these are limited in that they only allow two vehicles at best to be simultaneously loaded and unloaded as each loading bay must be brought to the required level for loading and unloading. In addition, the central axles and bearings must be extremely heavy to carry the fully-loaded structure.

SUMMARY OF THE PRESENT INVENTION

It is an object of the present invention to provide a storage structure which is space efficient.

It is a preferred object which provides a structure with ready access for loading and retrieval of stored items.

It is a further preferred object to provide a structure where the items can be stored on self-righting platforms.

Other preferred objects of the present invention will become apparent from the following description.

In one aspect the present invention resides in a rotary storage structure including:

a substantially circular main frame;

a plurality of storage zones or bays within the main frame to store items;

means to support at least a portion of the periphery of the main frame for rotation about an axis;

means to rotate the main frame; and means to engage or support the items in the storage zones or bays as the main frame is rotated; the main frame being rotated to selectively bring the storage zones or bays to loading and unloading positions.

In a second aspect the present invention resides in a rotary storage structure including:

means to support at least a portion of the periphery of the main frame for rotation about an axis;

means to rotate the main frame;

a series of substantially cylindrical support frames between the substantially annular ends of the main frame each defining a storage zone or bay; and a support platform, mounted in each support frame for rotation therein, adapted to horizontally support a item loaded on the support platform as the main frame is rotated, the main frame being rotated to selectively bring each support platform to a loading and unloading position.

The support frames, defining the storage zones, may include a pair of coaxially aligned, substantially circular rings or rails in the main frame and aligned therewith, the support platforms being supported on the circular rings. Alternatively the storage zones may include a plurality of tubes or pipes, e.g. circular, square, rectangular, hexagonal or other geometrical shape in end profile and nested together. (The tubes may be welded or strapped together to form a structure with great lateral strength). Support platforms may be provided in the tubes or pipes to support the items in the tubes horizontally or clamping or locking means may be provided to secure the items as the main frame is rotated.

The main frame may be divided into a plurality of concentric sub-frames, one within the other, and independently rotatable, each sub-frame having one circle of loading zones rotatable about the axis of the structure.

Preferably the means to support the main frame includes at least a curved rail or track below the main frame supporting bearing rollers or balls which engage the outer periphery of the main frame.

The means to rotate the main frame, or the sub-frames, may include tensioned rope or cable drives, racks and pinions, or friction drive e.g. between the supporting bearing rollers and the main frame. Preferably an indexing motor is provided to rotate the main frame to selectively position each loading zone at its loading and/or unloading position. (Preferably the loading and unloading positions are spaced 180° apart so that one loading zone can be unloaded as the opposite loading zone is being loaded).

Ramps or platforms may be provided to bring the items to the loading, or move the items from the unloading positions. Alternatively forklifts or other suitable handling equipment may be used to load or unload the items.

BRIEF DESCRIPTION OF THE DRAWINGS

To enable the invention to be fully understood, a number of preferred embodiments will now be described with reference to the accompanying drawings, in which.

DETAILED DESCRIPTION OF THE PREFERRED EMBODIMENTS

Figure 1:
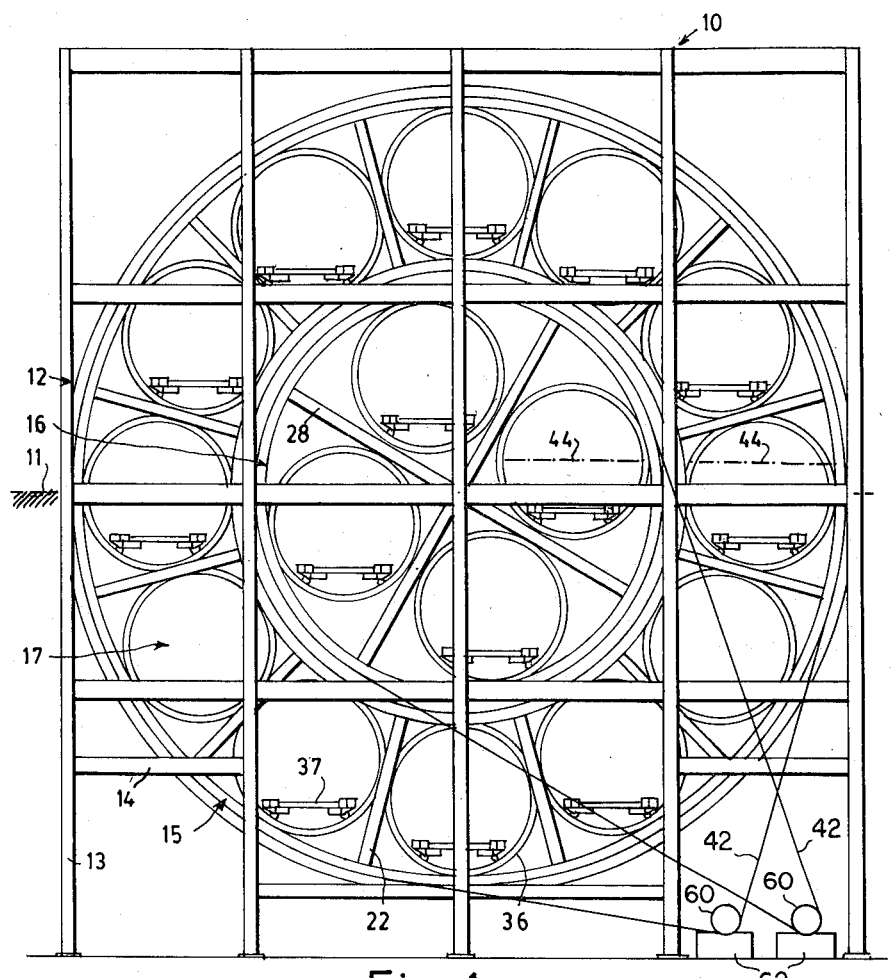
FIG. 1 is a front view of a first embodiment of the present invention.

Referring to FIGS. 1 to 9, the structure 10 is suitable as a parking structure for motor vehicles or boats and is partially underground, the ground level being indicated by the dashed line 11.

The structure has a support frame 12 with a plurality of spaced uprights 13 interconnected by horizontal crossbeams 14.

A pair of concentric sub-frames 15, 16 are mounted within the support frame 12 and each is divided into a plurality of storage zones 17.

Figures 2, 3, 4, 5:
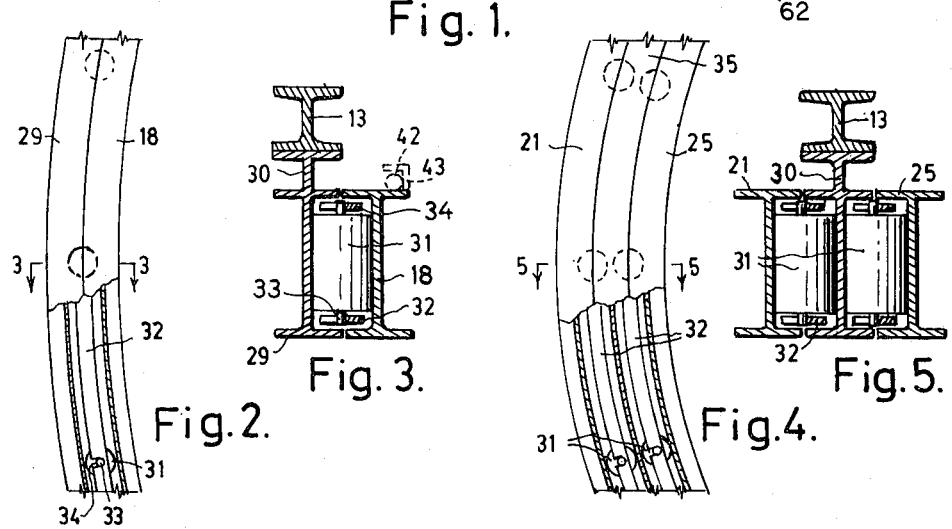
FIG. 2 is a front view of the support structure from the outer sub-frame, partly in section.
FIG. 3 is a sectional end view taken on line 3—3 on FIG. 2.
FIG. 4 is a front view of the support structure intermediate the inner and outer sub-frames.
FIG. 5 is a sectional end view taken on line 5—5 on FIG. 4.
Figures 6, 7, 8:
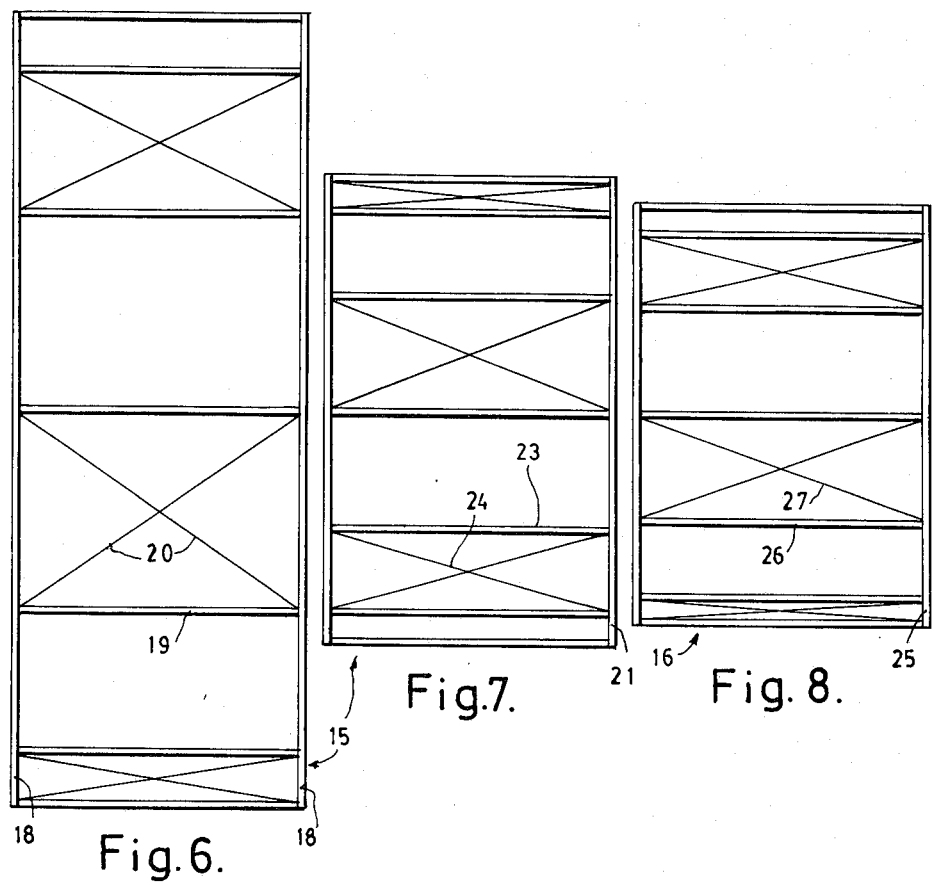
FIG. 6 is a side view of the outer frame of the outer sub-frame.
FIG. 7 is a similar view of the inner frame of the outer sub-frame.
FIG. 8 is a similar view of the outer frame of the inner sub-frame.

Referring to FIGS. 2, 3 and 6, the outer sub-frame 15 has a pair of circular outer rings 18 of substantially H-section, the rings being interconnected by inner rails 19 and tensioned bracing 20. A pair of inner rings 21 (FIG. 4), coaxial and aligned with the outer rings, are connected to the outer rings by radially extending arms 22, and the inner rings (also of H-section) are interconnected by cross-rails 23 and tensioned bracing 24 (see FIG. 7).

Referring to FIGS. 4, 5 and 8, the inner sub-frame 16 has a pair of circular outer rings 25, of substantially H-section, interconnected by cross rails 26 and tensioned bracing 27, and with radially extending arms 28 extending across the rings 25.

Referring to FIGS. 2 and 3, a curved track 29 is provided around each of the outer rings 18 of the outer sub-frame with a small clearance, the curved track being of H-section and mounted on the uprights 13 and cross-beams 14 by suitable brackets 30. Spaced rollers 31 are provided between the tracks 29 and the outer rings 18 to support the outer sub-frame 15 as it rotates within the structure 10. A pair of spacer rings 32 are provided between the tracks and rings to locate the rollers which have their axles 33 movable in slots 34. The weight of the outer sub-frame is transmitted to the circular tracks 29 by the rollers 31 in the manner of a large roller bearing.

Circular tracks 35 are provided intermediate the inner ring 21 of the outer sub-frame 15 and the outer ring 25 of the inner sub-frame 16 at each end of the structure. These tracks 35 are also of H-section and are mounted on the uprights 13 on crossbeams 14 by suitable brackets 30. Rollers 31, spaced by space rings 32, support the weight of the inner and outer sub-frames 16, 15 and transmit it to the structure.

By the use of the circular tracks 29, 35, the need for heavy central support axles for the sub-frames is obviated.

Figure 9:
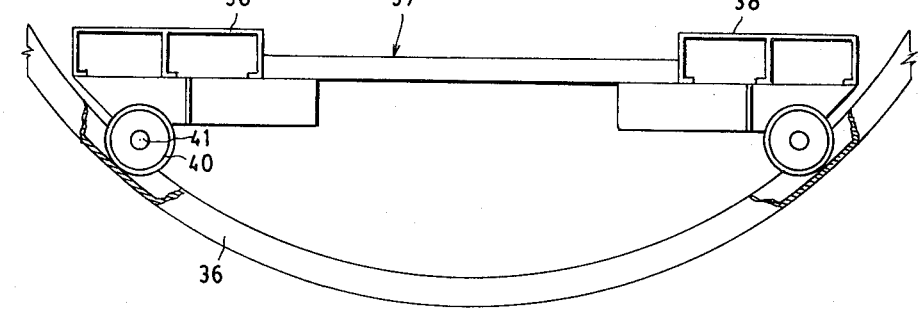
FIG. 9 is a front view of a self-righting support plateform.

Referring to FIG. 9, a plurality of storage zones 17 are defined in each sub-frame by circular channels 36 at each end of the sub-frames fixed to the circular rings 18, 21, 25 and radially extending arms 22, 28.

A self-righting storage platform 37 is provided in each storage zone, and for motor vehicles has a pair of parallel wheel-supporting tracks 38 interconnected by crossbeams. Wheels 40 are rotatably mounted on axles 41 under the tracks 38 and the wheels 40 run in the circular channels 36 as the sub-frames are rotated.

While friction or rack and pinion mechanical drive may be used to rotate the inner and outer sub-frames independently, it is preferred that a respective drive cable 42 (FIG. 3) engage suitable sheaves 43 provided on one face of either the outer or inner rings 18, 21 of the outer sub-frame, and the outer ring 25 of the inner sub-frame, the cables being passed around driving drums 60 on respective electric motors 62 on the structure. Each motor 62 may have an indexing control to bring each storage platform 37 to a respective loading and unloading position adjacent a ramp or platform (indicated by the dashed lines 44) and the cables may be tensioned by respective idler pulleys fitted with tensioning weights which are supported by one of the runs of the cables.

In use, the inner and outer sub-frames are respectively (and independently) rotated to bring a respective storage platform 37 to the level of a loading ramp or platform 44. A vehicle may then be driven from the loading platform or ramp 44 onto the storage platform 37, or vice versa. The sub-frames are then rotated to load or unload the next vehicle.

For efficiency, the loading and unloading ramps or platforms 44 for each sub-frame may be aligned so that as soon as the vehicle is driven off the storage platform 37, the latter is ready to receive another vehicle. Alternatively, the loading ramps or platforms 44 may be at the same level but on opposite sides of the rotational axis of the structure.

In certain applications, the vehicles or boats may be driven or loaded onto the storage platforms 37 and these in turn lifted and placed in the sub-frames using suitable lifting means.

In a marina, the lifting means may be provided over water filled channels to enable the boats to be sailed or driven adjacent to the structure.

While the structure 10 is shown with two concentric sub-frames 15, 16, three or more sub-frames may be provided to increase the number of parking spaces available.

The use of the self-righting platforms ensures that the vehicles are maintained horizontally as the sub-frames rotate.

While a parking structure for vehicles has been described, the structure could be used to store e.g. loaded pallets or shipping containers or, on a reduced scale, office files or books (e.g. in a library or in archives) as the principal of the invention is applicable over this wide range of scales.

Figure 10:
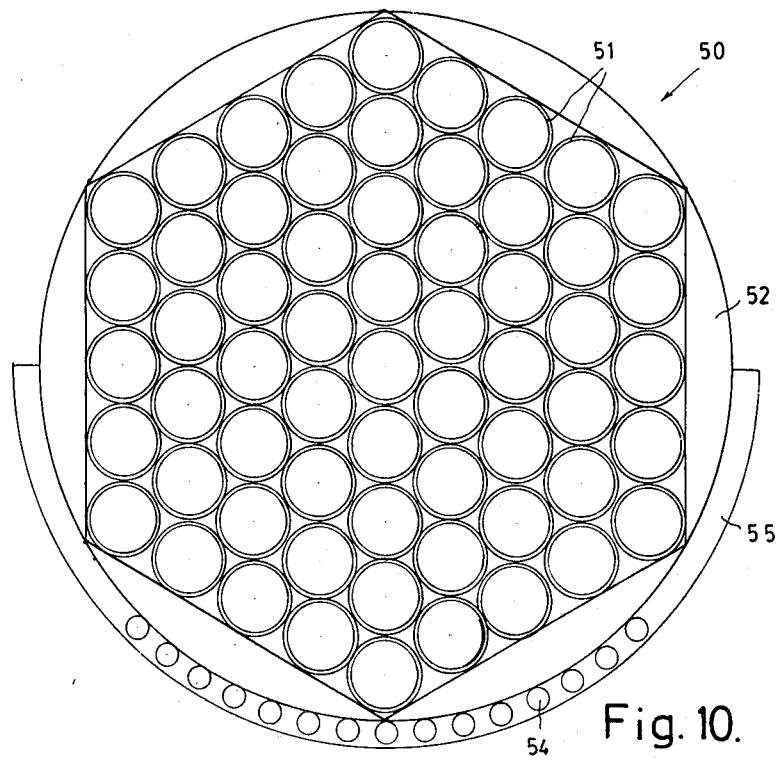
FIG. 10 is a schematic end view of a second embodiment of the present invention.
Figure 11:
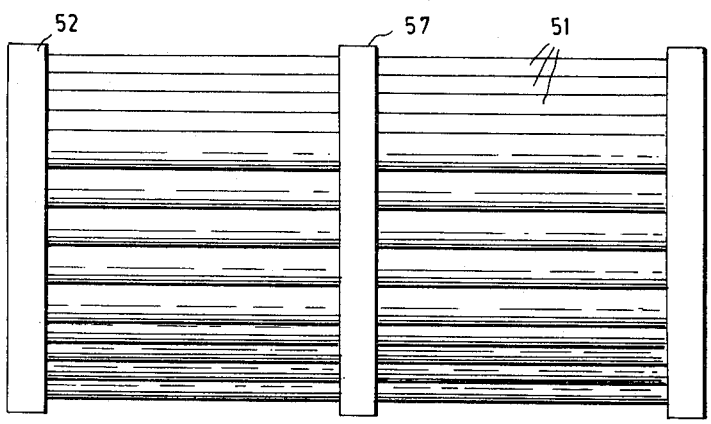
FIG. 11 is a schematic side view of the second embodiment.

Referring now to the second embodiment of FIGS. 10 and 11, the structure 50 has a plurality of tubes 51 nested or welded together.

The main frame comprises a pair of end rings 52 and a central ring 57 around the tubes. The rings 52, 53 are supported by spaced rollers 54 in a curved track 55 in the manner hereinbefore described. The structure is rotated by driving one or more of the rollers 54 which is/are in frictional contact with the rings 52,53.

The items may be stored on self-righting platforms similar to those shown in FIG. 9 or may be placed in the tubes 51 and clamped or locked into position. The structure is particularly suitable for storing cylindrical items such as beer barrels as the items are constrained within the tubes and the items can be loaded or unloaded anywhere in the structure.

The structure may be divided into a series of concentric sub-frames, each fitted with a plurality of tubes, and the sub-frames being independently rotatable in the manner of the first embodiment.

It will be readily apparent to the skilled addressee that the embodiments described space efficient storge structures where loading and unloading is facilitated.

Various changes and modifications may be made to the embodiments described without departing from the scope of the present invention as defined in the appended claims.

I claim:

1. In a rotary parking structure for vehicles the improvement comprising:
   (a) a free standing support frame having a plurality of spaced vertical uprights defining two opposing sides, the uprights in each said opposing side being interconnected by crossbeams, said uprights including mounting faces;
   (b) a first pair of circular support tracks, and means for rigidly securing said first pair of tracks to said vertical uprights at both sides of the structure, said securing means being in abutting engagement with the adjacent faces of the uprights;
   (c) an independent rotatable outer subframe which includes
       a pair of outer rings, a separate outer ring concentric with a separate first support track, said outer rings defining tracks in opposing spaced relationship with said first support tracks, and
       a pair of inner rings, a separate inner ring concentric with a separate outer ring and first support track, said inner rings defining tracks;
   (d) a second pair of circular support tracks concentric with said first support tracks, each of said second support tracks having inner and outer track members, and means for securing said second support tracks to the uprights of said support frame, and securing means being in abutting engagement with the adjacent faces of the urights, the outer track member of each said second support track being in opposing spaced relationship with the track of a separate said inner ring;
   (e) an independent rotatable inner subframe concentric with and having a smaller diameter than said outer subframe and which includes a pair of rings, a separate inner subframe ring concentric with a separate second circular support track, said inner subframe rings defining tracks in opposing spaced relationship with the inner track members of said second support tracks;
   (f) bearing rollers mounted between said spaced opposing tracks for permitting rolling movement of said inner and outer subframes relative to said first and second circular support tracks, and thus said support frame, said rollers being mounted between said spaced opposing tracks without fixed bearing means so as to transfer the weight of said subframes and the vehicles parked in said parking structure directly to said first and second circular support tracks, and thereby to said support frame to which said support tracks are secured;
   (g) means for independently rotating said first and second subframes to bring each, independently, to a loading or unloading position;
   (h) a series of spaced, substantially cylindrical storage frames defining storage zones and positioned within said first and second subframes for rotation therewith; and
   (i) vehicle-supporting platform means freely positioned in each storage frame for rotation therewith and movement relative thereto, the free positioning permitting said support platform means to remain horizontal during rotation of the subframe in which it is positioned so as to horizontally support the vehicles at all times.

2. The parking structure of claim 1 wherein said storage frames extend throughout the space defined by each sub-frame, and terminate adjacent said support frame, each storage frame including a circular track for rollably supporting said platform means.

3. The parking structure of claim 2 wherein each platform means includes wheels engaged in the circular track.

4. The parking structure of claim 1 wherein said drive means for each sub-frame includes a cable operatively engaged with the sub-frame and a motor-driven drum, and tensioning means for maintaining the cable under tension.

5. The parking structure of claim 1 wherein a loading surface mounted to said support frame is provided for loading or unloading vehicles from said platform means.

6. The parking structure of claim 1, wherein each said bearing roller includes an axle and a pair of spacer rings, a separate spacer ring positioned on said axle on each side of said bearing roller, said spacer rings serving to locate said bearing rollers between said spaced opposing tracks.

* * * * *